US010907516B2

(12) United States Patent
Matsuo et al.

(10) Patent No.: US 10,907,516 B2
(45) Date of Patent: Feb. 2, 2021

(54) BALANCER DEVICE FOR INTERNAL COMBUSTION ENGINE

(71) Applicant: HITACHI AUTOMOTIVE SYSTEMS, LTD., Hitachinaka (JP)

(72) Inventors: Masatoshi Matsuo, Atsugi (JP); Masaharu Kitamura, Atsugi (JP); Masahumi Kurita, Zama (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/346,958

(22) PCT Filed: Oct. 25, 2017

(86) PCT No.: PCT/JP2017/038474
§ 371 (c)(1),
(2) Date: May 2, 2019

(87) PCT Pub. No.: WO2018/084045
PCT Pub. Date: May 11, 2018

(65) Prior Publication Data
US 2020/0063612 A1 Feb. 27, 2020

(30) Foreign Application Priority Data
Nov. 4, 2016 (JP) ................... 2016-215950

(51) Int. Cl.
F01M 1/02 (2006.01)
F01M 9/10 (2006.01)
(Continued)

(52) U.S. Cl.
CPC ............... F01M 1/02 (2013.01); F01M 9/10 (2013.01); F01M 2001/0276 (2013.01);
(Continued)

(58) Field of Classification Search
CPC .... F01M 1/02; F01M 9/10; F01M 2001/0276; F16F 15/26; F16F 15/265; F02G 2270/85; F02B 2075/027; F02B 77/00
See application file for complete search history.

(56) References Cited

FOREIGN PATENT DOCUMENTS

| CN | 204476495 U | * | 7/2015 | |
|----|-------------|---|--------|---|
| JP | 2010-230129 A | | 10/2010 | |
| WO | WO-2014057325 A1 | * | 4/2014 | ............ F16F 15/264 |

OTHER PUBLICATIONS

International Search Report dated Jan. 16, 2018 in International Application No. PCT/JP2017/038474.
(Continued)

Primary Examiner — Jacob M Amick
Assistant Examiner — Charles Brauch
(74) Attorney, Agent, or Firm — Foley & Lardner LLP

(57) ABSTRACT

There is provided a balancer device for an internal combustion engine that suppresses lubricating oil from failing onto a reduction gear and a pump drive gear provided to drive and rotate an oil pump and thereby suppresses an increase in resistance against rotation between the reduction gear and the pump drive gear. The balancer device for the internal combustion engine includes a lower side housing on which a balancer drive gear, a first balancer shaft including a first balance weight, a first gear, a second gear, a second balancer shaft including a second balance weight, and the reduction gear are mounted. The balancer device also includes an upper side housing formed in such a shape that covers the balancer drive gear, the first balancer shaft including the first balance weight, the first gear, the second gear, the second balancer shaft including the second balance weight, the reduction gear, and the pump drive gear from above in the state that the oil pump is assembled with the upper side housing such that the pump drive gear is meshed with the reduction gear. The upper side housing is assembled with the
(Continued)

lower side housing. The balancer device further includes an exposure opening formed in the upper side housing such that only the balancer drive gear is exposed from the upper side housing to be meshed with an engine-side gear.

5 Claims, 8 Drawing Sheets

(51) Int. Cl.
  *F02B 77/00* (2006.01)
  *F02B 75/02* (2006.01)
  *F16F 15/26* (2006.01)
(52) U.S. Cl.
  CPC ......... *F02B 77/00* (2013.01); *F02B 2075/027* (2013.01); *F02G 2270/85* (2013.01); *F16F 15/26* (2013.01)

(56) References Cited

OTHER PUBLICATIONS

Written Opinion of the International Searching Authority dated Jan. 16, 2018 in International Application No. PCT/JP2017/038474.

* cited by examiner

BALANCER DEVICE FOR INTERNAL COMBUSTION ENGINE

TECHNICAL FIELD

The present invention relates to a balancer device for an internal combustion engine and more specifically to a balancer device for an internal combustion engine provided with an oil pump.

BACKGROUND ART

An internal combustion engine is generally provided with a balancer device configured such that a first balancer shaft driven by a crankshaft and a second balancer shaft driven by this first balancer shaft are rotatably contained. This balancer device serves to reduce the vibrations generated in the internal combustion engine. Balance weights are provided on these first balancer shaft and second balancer shaft, respectively. In order to reduce the vibrations of the internal combustion engine, the first balancer shaft and the second balancer shaft are rotated at a rotation speed twice the rotation speed of the crankshaft, and the force of inertia generated in the crankshaft is made to balance with the force of inertia generated in the first balancer shaft and the second balancer shaft.

Furthermore, as described in JP 2010-230129A (Patent Literature 1), this balancer device is fastened to a lower portion of a main body of the internal combustion engine to be placed in an oil pan. The first balancer shaft out of the two balancer shafts is driven and rotated by the crankshaft, and the second balancer shaft is driven by this first balancer shaft via gear transmission means for synchronization and is configured to drive an oil pump.

CITATION LIST

Patent Literature

Patent Literature 1: JP 2010-230129A

SUMMARY OF INVENTION

Technical Problem

In this balancer device, the first balancer shaft and the second balancer shaft are arranged parallel to each other, and a gear transmission mechanism, in which a first gear and a second gear are respectively meshed at one end of the first balancer shaft and one end of the second balancer shaft, is provided. The first gear and the second gear have an identical number of teeth, and the first balancer shaft and the second balancer shaft are synchronously rotated at an identical rotation speed.

A balancer drive gear is provided on the other end of the first balancer shaft, and a reduction gear for driving the oil pump is provided on the other end of the second balancer shaft. This reduction gear is meshed with a pump drive gear that is fixed to a rotating shaft of the oil pump. An engine-side gear that is rotated by the internal combustion engine is meshed with the balancer drive gear of the first balance shaft. Thus, when the engine-side gear is rotated by the internal combustion engine, this rotation is transmitted in a sequence of the balancer drive gear, the first balancer shaft, the first gear, the second gear, the second balancer shaft, the reduction gear and the pump drive gear to eventually rotate the oil pump.

The balancer drive gear, the first balancer shaft, the first gear, the second gear, the second balancer shaft and the reduction gear described above are mounted on a lower side housing and are covered by an upper side housing that is combined with the lower side housing such as to be placed in a space formed by these two housings.

The engine-side gear is meshed from above with the balancer drive gear. Thus, a region of the upper side housing where the balancer drive gear and the pump drive gear placed near to the balancer drive gear are located is cut off to be open.

The balancer device is placed in the oil pan on the lower side of the internal combustion engine. This configuration suffers from a phenomenon that lubricating oil dropping from the internal combustion engine located above the balancer device is likely to fall from the cut open portion of the upper side housing onto the balancer drive gear and the pump drive gear placed near to the balancer drive gear.

Although this phenomenon is unavoidable since the balancer drive gear is meshed with the engine-side gear, the lubricating oil unnecessarily falling on the pump drive gear provided to drive and rotate the oil pump increases the rotational resistance due to the viscosity of the lubricating oil in an meshing portion between the pump drive gear and the reduction gear. Especially under low temperature condition, the lubricating oil has high viscosity, and thus the increased rotational resistance is not negligible in terms of the fuel consumption and the like.

An object of the preset invention is to provide a novel balancer device for an internal combustion engine that minimizes lubricating oil falling on a pump drive gear provided to drive and rotate an oil pump and thereby suppresses an increase in rotational resistance in a meshing portion between a reduction gear and the pump drive gear.

Solution to Problem

According to one aspect of the present invention, a balancer device for an internal combustion engine includes a configuration, in which a balancer drive gear, a first balancer shaft including a balance weight, a first gear, a second gear, a second balancer shaft including a balance weight, and a reduction gear are mounted on a lower side housing; an upper side housing formed in such a shape that covers the balancer drive gear, the first balancer shaft including the balance weight, the first gear, the second gear, the second balancer shaft including the balance weight, the reduction gear, and a pump drive gear of an oil pump from above in the state that the oil pump is assembled with the lower side housing such that the pump drive gear is meshed with the reduction gear; and only the balancer drive gear is exposed from an exposure opening formed in the upper side housing to be meshed with an engine-side gear.

According to this aspect of the present invention, the components of the balancer device that exclude the exposure opening of the upper side housing but include the pump drive gear of the oil pump are covered by the upper side housing. This configuration suppresses lubricating oil dropping from the internal combustion engine from falling on the pump drive gear provided to drive the oil pump and thereby suppresses an increase in rotational resistance at a meshing portion between the reduction gear and the pump drive gear.

DESCRIPTION OF EMBODIMENTS

The following describes in detail embodiments of the present invention with reference to drawings. The present invention is, however, not limited to the following embodiments but includes various modifications and applications based on the technical concept of the present invention within the scope of the present invention.

Figure 1:
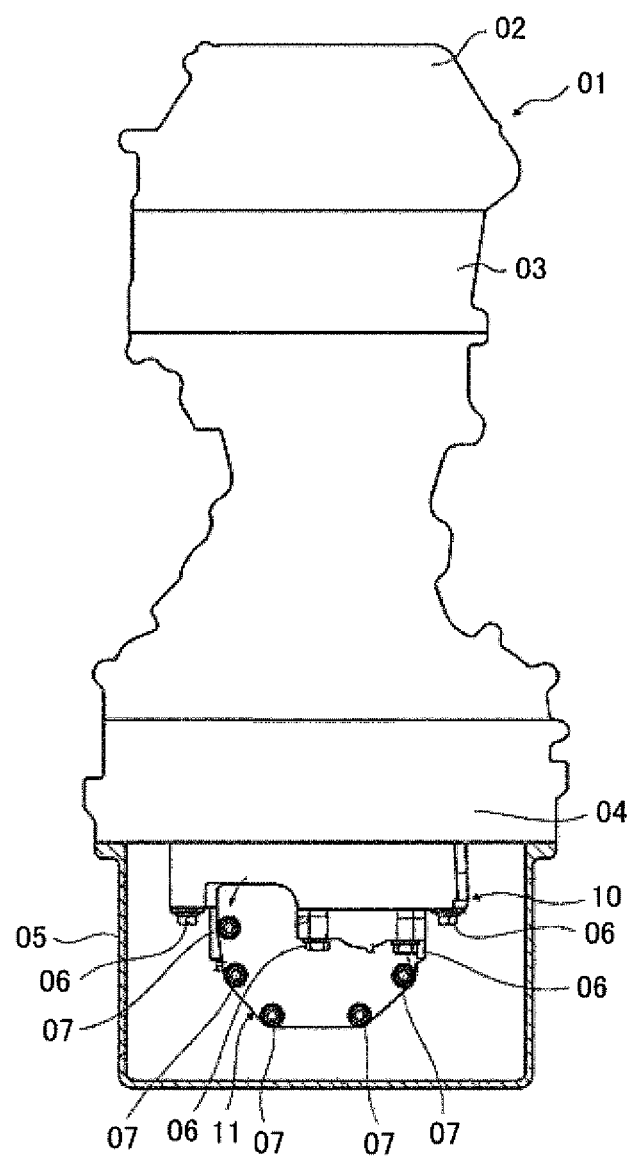
FIG. 1 is a cross sectional view illustrating a cross section of an internal combustion engine provided with a balancer device.

Prior to description of embodiments of the present invention, the installation state of an internal combustion engine and a balancer device is described first with reference to FIG. 1. FIG. 1 is a vertical cross sectional view illustrating an internal combustion engine 01. The internal combustion engine 01 is, for example, an inline four-cylinder reciprocating internal combustion engine. A cylinder block 03 is provided under a cylinder head 02, and a rudder frame 04 is fixed to a lower surface of the cylinder block 03. A non-illustrated crankshaft is rotatably supported by the rudder frame 04 and is arranged such that its axial direction is along a front-rear direction of the internal combustion engine.

The internal combustion engine 01 is mounted on a vehicle such that the crankshaft is arranged laterally relative to a front-rear direction of a vehicle body. A non-illustrated engine-side gear is fixed to part of the crankshaft in the axial direction. The engine-side gear is a drive gear used to drive the balancer device described below. Additionally, an oil pan 05 is mounted below the rudder frame 04 to store lubricating oil inside thereof. The balancer device 10 configured to suppress secondary vibrations of the internal combustion engine 01 is placed inside of this oil pan 05 to be soaked in the lubricating oil.

The balancer device 10 includes an upper side housing, a lower side housing, a balancer main body, and an oil pump 11 as described in detail later. The upper side housing and the lower side housing are fixed to a lower surface of the rudder frame 04 by means of a plurality of balancer fastening bolts 06 to be laid one over the other in a vertical direction. The oil pump 11 is coupled and integrated with the balancer device 10 by means of a plurality of oil pump fastening bolts 07. The oil pump 11 is a variable displacement oil pump that changes the amount of volume change of a pump chamber according to a predetermined operating condition.

The variable displacement oil pump used according to the embodiment is a vane pump having a mechanism of reducing the amount of volume change of the pump chamber at the high pump rotation speed and may be, for example, a known pump described in JP 2011-111926A or the like. The oil pump 11 is fixed to a front side of the lower side housing by the plurality of oil pump fastening bolts 07. The oil pump 11 is mounted to the lower side housing and accordingly has a high support rigidity.

As shown in FIG. 1, the balancer device 10 is placed in the oil pan 05 on the lower side of the internal combustion engine. Thus, the conventional balancer device 10 is likely to suffer from such a phenomenon that the lubricating oil dropping from the internal combustion engine 01 located on the upper side of the balancer device 10 falls on a balancer drive gear and a pump drive gear placed close to the balancer drive gear. The lubricating oil unnecessarily falling on the pump drive gear provided to drive and rotate the oil pump increases the rotational resistance due to the viscosity of the lubricating oil in a meshing portion between the pump drive gear and a reduction gear. Especially under low temperature condition, the lubricating oil has high viscosity, and the increased resistance is not negligible in terms of the fuel consumption and the like.

The embodiment proposes a configuration that minimizes the possibility that the lubricating oil falls on the pump drive gear provided to drive and rotate the oil pump 11 and suppresses an increase in rotational resistance in the meshing portion between the reduction gear and the pump drive gear. The following describes the balancer device for the internal combustion engine according to the embodiment.

Embodiment 1

Figure 2:
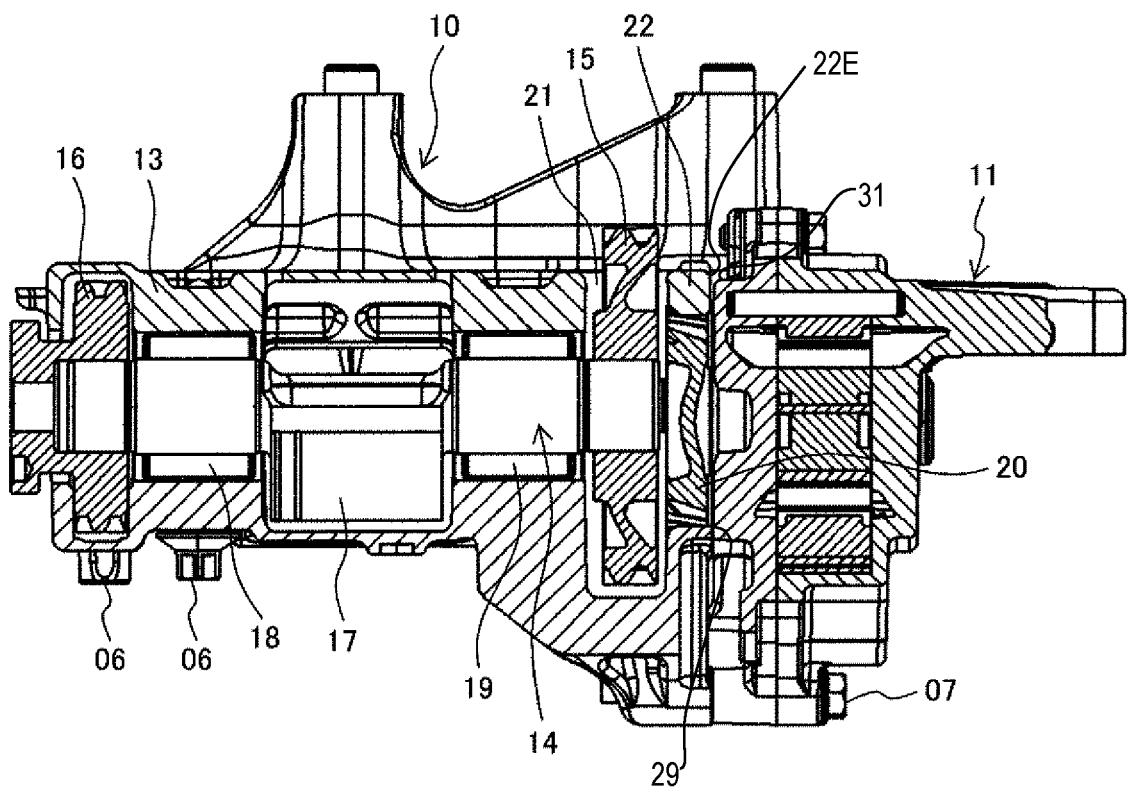
FIG. 2 is a cross sectional view illustrating a balancer device sectioned in an axial direction according to a first embodiment of the present invention.

A first embodiment of the present invention is described in detail with reference to FIGS. 2 to 7. FIG. 2 illustrates a cross section in an axial direction of the balancer device 10. The left side of the drawing corresponds to a front side of a vehicle, and the right side of the drawing corresponds to a rear side of the vehicle. This balancer device 10 is fixed to the rudder frame 04 as shown in FIG. 1.

In FIG. 2, the oil pump 11 is fixed on the rear side of the balancer device 10 and is driven and rotated by a second balancer shaft built in the balancer device 10. The balancer device 10 is configured such that a balancer main body is accommodated in an accommodating space formed by a lower side housing 12 and an upper side housing 13. FIG. 2 illustrates a cross section on a first balancer shaft 14-side. A balancer drive gear 15 is fixed on an end face of the first balancer shaft 14 on the oil pump 11-side. This balancer drive gear 15 is driven and rotated by an engine-side gear (refer to an engine-side gear 30 shown in FIG. 6) that is rotated by a crankshaft.

A first gear 16 included in a gear transmission mechanism is fixed to the other end of the first balancer shaft 14 and is configured to mesh with a second gear fixed to the non-illustrated second balancer shaft. Additionally, a first balancer weight 17 is provided on the first balancer shaft 14 placed between the balancer drive gear 15 and the first gear 16. A portion between the first balancer weight 17 and the first gear 16 is supported by a front-side first bearing 18. A portion between the balancer weight 17 and the balancer drive gear 15 is supported by a rear-side first bearing 19.

A pump drive gear 20 is fixed to a rotating shaft of the oil pump 11 and is rotated by a reduction gear that is fixed to an end face of the non-illustrated second balancer shaft. This pump drive gear 20 is integrated with the oil pump 11 and is assembled with the balancer device 10 to be meshed with the reduction gear. Accordingly, the pump drive gear 20 is configured to be placed between the oil pump 11 and oil pump 11-side end faces of the lower side housing 12 and the upper side housing 13. In other words, the pump drive gear 20 is placed in a space formed by the contact of an oil receiver portion 29 provided on the oil pump 11-side end face of the lower side housing 12 with the oil pump 11 in a direction of a rotational axis of the first balancer shaft 14.

An exposure opening 21 is formed in a region where the balancer drive gear 15 of the upper side housing 13 is placed. Part of the balancer drive gear 15 is protruded upward from the exposure opening 21 to be exposed. This configuration enables the balancer drive gear 15 to mesh with the engine-side gear. An oil shield wall 22 is formed in the upper side housing 13 to be located on the oil pump 11-side of the exposure opening 21 and is configured to cover the pump drive gear 20 from above. The details of this oil shield wall 22 will be described later with reference to FIGS. 4 to 7.

Figure 3:
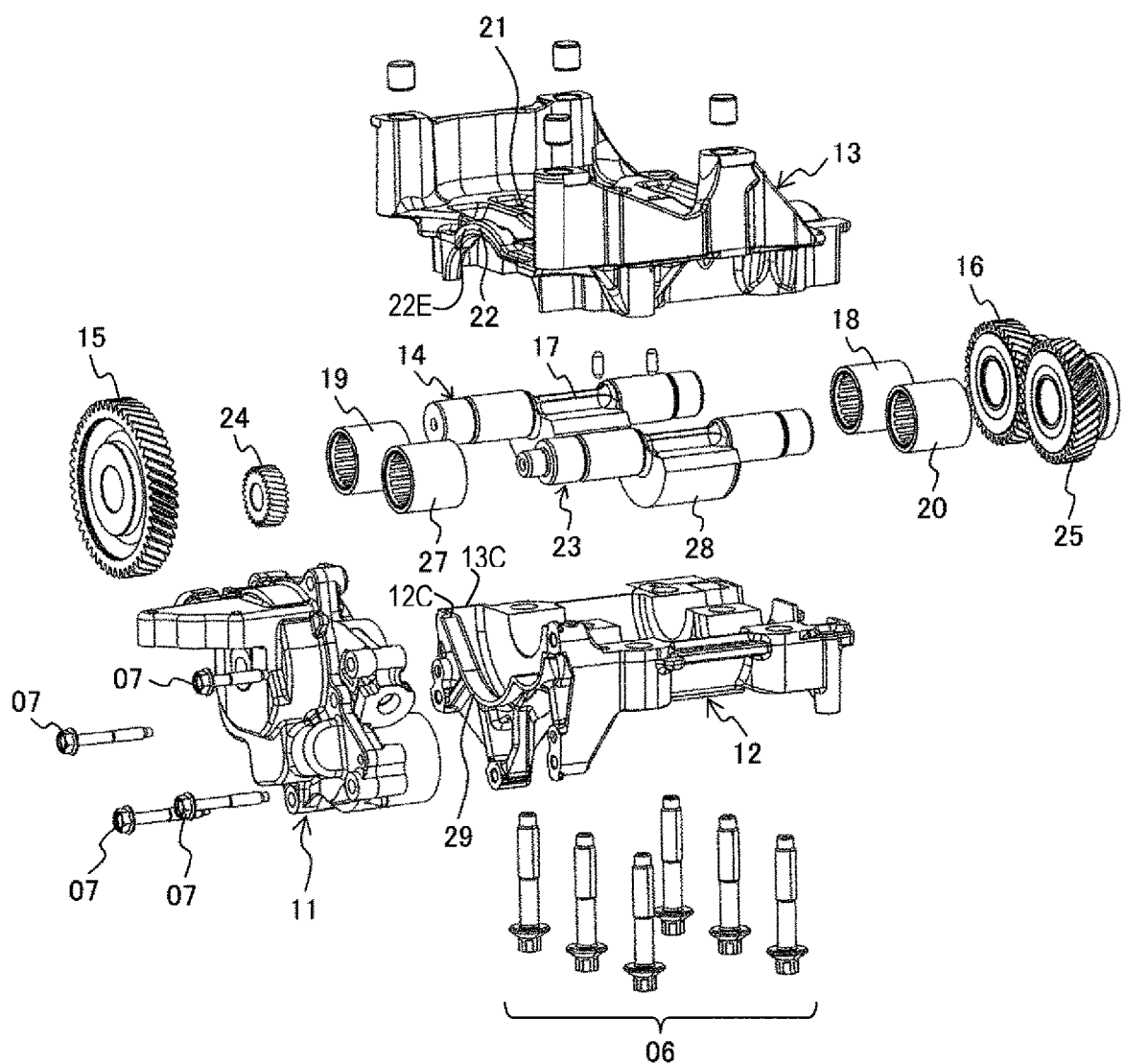
FIG. 3 is an exploded perspective view illustrating the balancer device shown in FIG. 2.

FIG. 3 is an exploded perspective view illustrating respective components of the balancer device 10 shown in FIG. 2. The balancer main body configured to suppress vibrations of the internal combustion engine is accommodated in the accommodating space formed by the lower side housing 12 and the upper side housing 13. Additionally, the oil pump 11 is fixed on the rear side that is the left side of the drawing.

The balancer main body includes a first rotating system having a balance weight and a second rotating system having a balance weight, and is configured such that the rotation of the first rotating system is inverted by the gear transmission mechanism to rotate the second rotating system. The rotations of the first rotating system and the second rotating system generate a vibration force or more specifically a vibration force in an opposite phase to the phase of a secondary component of a vibration force of the internal combustion engine caused by the reciprocating motions of a piston, to reduce the vibrations of the internal combustion engine.

The first rotating system includes the balancer drive gear 15 and the first gear 16 fixed to the respective ends of the first balancer shaft 14, the rear-side first bearing 18 and the front-side first bearing 19 configured to support the first balancer shaft 14, and the first balance weight 17 provided on the first balancer shaft 14, as described above. The rear-side first bearing 18 and the front-side first bearing 19 are fixed and supported between the lower side housing 12 and the upper side housing 12, to rotate and support the first balancer shaft 14. The balancer drive gear 15 and the first gear 16 are rotatably accommodated in the accommodating space between the lower side housing 12 and the upper side housing 12.

The second rotating system includes, on the other hand, a reduction gear 24 and a second gear 25 fixed to the respective ends of a second balancer shaft 23, a rear-side second bearing 26 and a front-side second bearing 27 configured to support the second balancer shaft 23, and a second balance weight 28 provided on the second balancer shaft 23. The reduction gear 24 is meshed with the pump drive gear 20 that is fixed to the rotating shaft of the oil pump 11, to rotate the pump drive gear 20.

The rear-side second bearing 26 and the front-side second bearing 27 are fixed and supported between the lower side housing 12 and the upper side housing 12, to rotate and support the second balancer shaft 23. The reduction gear 24 and the second gear 25 are rotatably accommodated in the accommodating space between the lower side housing 12 and the upper side housing 12. The pump drive gear 20 is integrally fixed to the oil pump 11 and is accordingly hidden to be unseen in the drawing of FIG. 3.

The oil receiving portion 29 that is formed integrally with the lower side housing 12 is provided on the oil pump 11-side end face of the lower side housing 12. The reduction gear 24 and the pump drive gear 20 are placed above the oil receiving portion 29. Similarly, the oil shield wall 22 that is formed integrally with the upper side housing 13 is provided on the oil pump 11-side end face of the upper side housing 13. The reduction gear 24 and the pump drive gear 20 are placed below the oil shield wall 22. Accordingly, the reduction gear 24 and the pump drive gear 20 are vertically placed between the oil receiving portion 29 and the oil shield wall 22.

Rotating the engine-side gear fixed to the crankshaft that is located above the balancer device 10 rotates the balancer drive gear 15 at a rotation speed twice the rotation speed of the engine-side gear and also rotates the first balancer shaft 14 to which the balancer drive gear 15 is fixed. Rotating the second gear 25 meshed with the first gear 16 that is fixed to the first balancer shaft 14 rotates the second balancer shaft 23 that is phase adjusted relative to the first balancer shaft 14, so as to generate a balancer vibration force. This balancer device 10 generates the vibration force in the opposite phase to the phase of the secondary component of the vibration force of the internal combustion engine caused by the reciprocating motions of the piston, to reduce the vibrations of the internal combustion engine. This type of the balancer device 10 has been known well.

According to the embodiment, as shown in FIG. 2 and FIG. 3, the oil shield wall 22 provided to cover the upper side of the pump drive gear 20, which is fixed to the rotating shaft of the oil pump 11, in the state that the oil pump 11 is assembled with the balancer device 10 is formed in the upper side housing 13. The configuration that the oil shield wall 22 formed integrally with the upper side housing 13 is arranged to cover the upper side of the pump drive gear 20 suppresses the lubricating oil that drops from the internal combustion engine 01 and falls on the oil shield wall 22 of the upper side housing 13 from flowing to the pump drive gear 20.

This configuration suppresses the pump drive gear 20 from being directly exposed to the lubricating oil and suppresses an increase in rotational resistance caused by exposure of the meshing portion between the pump drive gear 20 and the reduction gear 24 to the lubricating oil.

Figure 4:
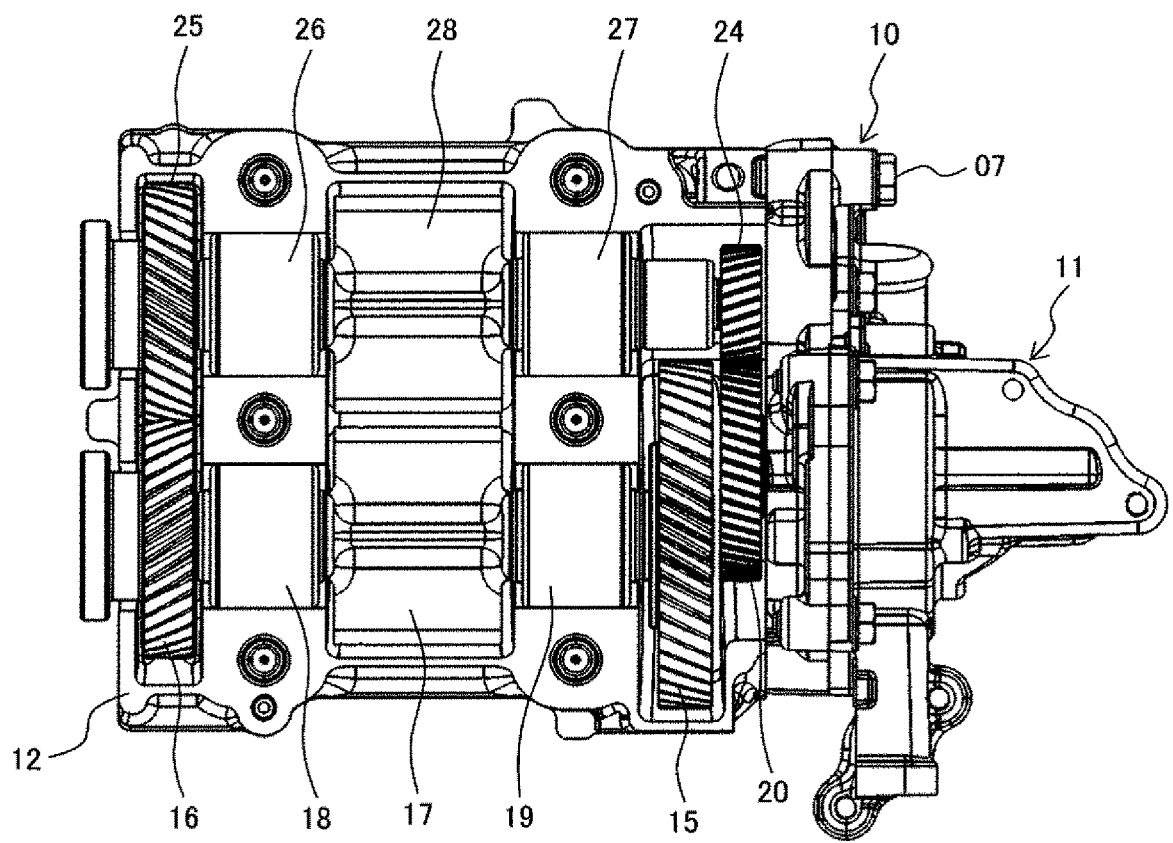
FIG. 4 is a top view illustrating the balancer device shown in FIG. 2 with an upper side housing detached therefrom.

The configuration of this oil shield wall 22 is further described. FIG. 4 is a top view illustrating the state that the upper side housing 13 is detached from the balancer device 10 with the oil pump 11 assembled therewith.

The balancer drive gear 15 and the first gear 16 are fixed to the respective ends of the first balancer shaft 14. The first balancer shaft 14 is supported by the rear-side first bearing 18 and the front-side first bearing 19. The first balance weight 17 is provided on the first balancer shaft 14 between the rear-side first bearing 18 and the front-side first bearing 19.

Similarly, the second gear 25 and the reduction gear 24 are fixed to the respective ends of the second balancer shaft 23 that is placed parallel to the first balancer shaft 14. The second balancer shaft 23 is supported by the rear-side second bearing 26 and the front-side second bearing 27. The second balance weight 28 is provided on the second balancer shaft 23 between the rear-side second bearing 26 and the front-side second bearing 27. The second gear 25 is rotated by the first gear 16. This rotates the second balancer shaft 23 and further rotates the reduction gear 24.

The pump drive gear 20 fixed to the rotating shaft of the oil pump 11 is provided between the oil pump 11 and the balancer drive gear 15 that is fixed to the first balancer shaft 14. This pump drive gear 20 is placed adjacent to the balancer drive gear 15. Furthermore, the pump drive gear 20 is meshed with the reduction gear 24 and is arranged such as to be flush with the reduction gear 24 in a radial direction.

Figure 5:
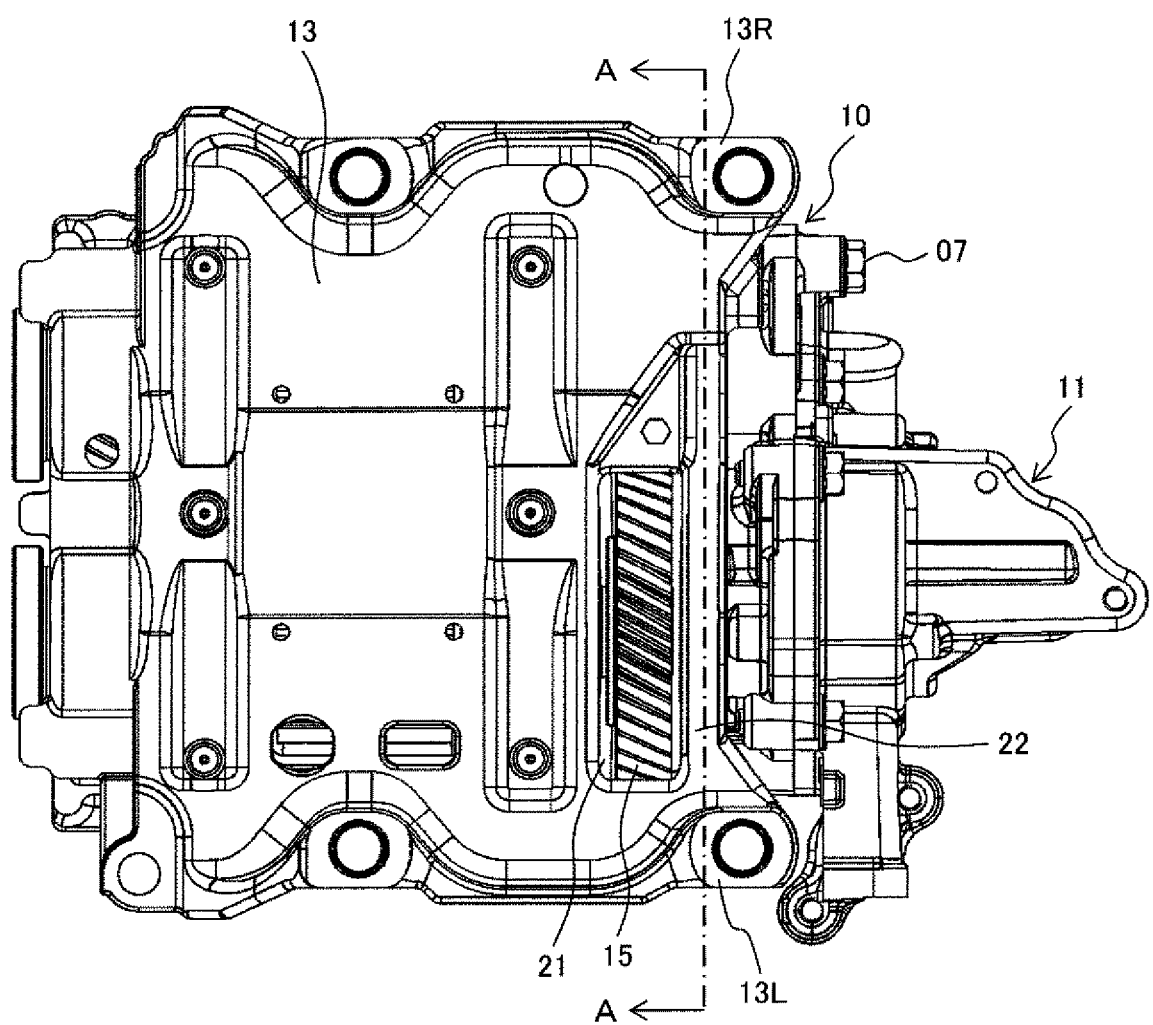
FIG. 5 is a top view illustrating the balancer device shown in FIG. 2 with the upper side housing attached thereto.
Figure 6:
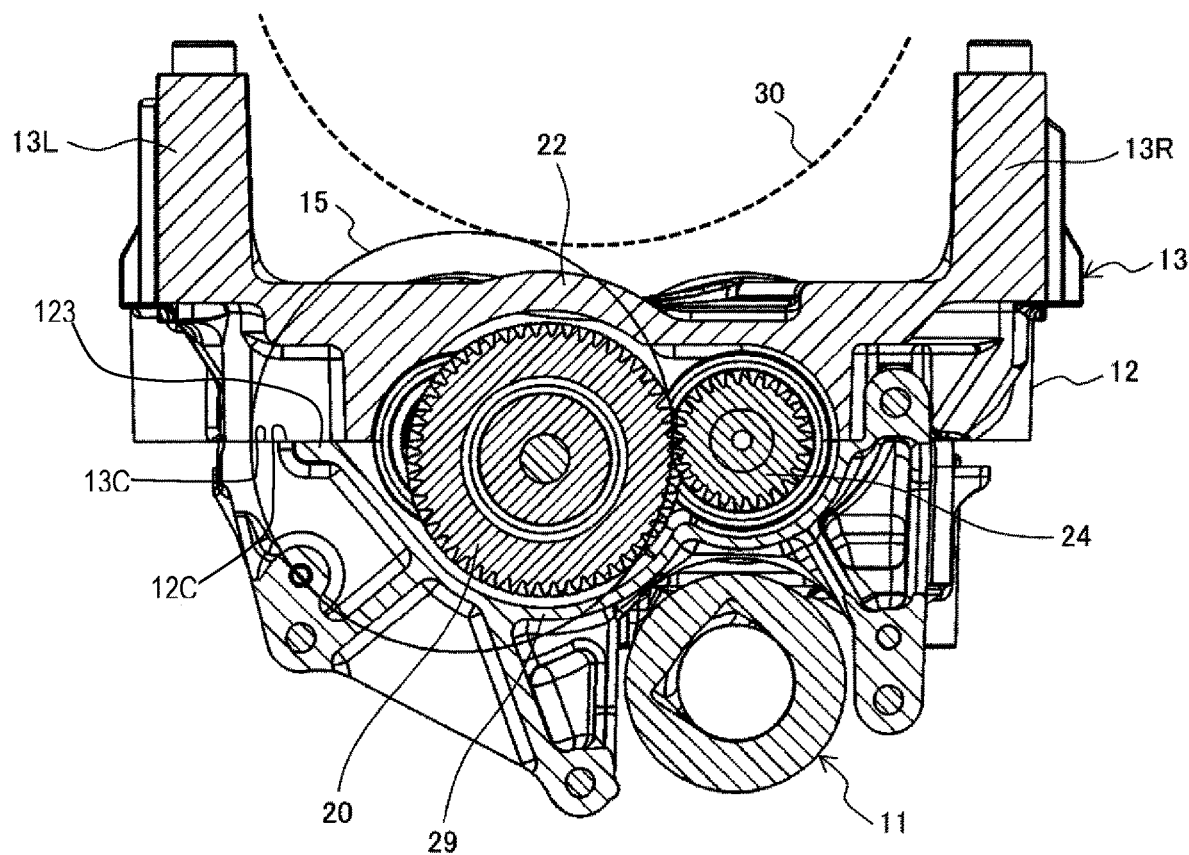
FIG. 6 is a cross sectional view illustrating a cross section in a radial direction of the balancer device taken along an A-A surface shown in FIG. 5.

FIG. 5 illustrates an upper surface in the state that the upper side housing 13 is mounted to the balancer device 10 shown in FIG. 4. FIG. 6 illustrates a cross section in the radial direction taken along an A-A surface shown in FIG. 5.

In FIG. 5 and FIG. 6, the exposure opening 21 is formed in the vicinity of the balancer drive gear 15 of the upper side housing 13. Part of the balancer drive gear 15 is exposed from this exposure opening 21. This configuration causes an engine-side gear 30 to be meshed with the exposed balancer drive gear 15 as shown in FIG. 6.

The oil shield wall 22 provided to cover the pump drive gear 20 and the reduction gear 24 from above is formed between the exposure opening 21 and the oil pump 11 or more specifically between the exposure opening 21 and the oil pump 11-side end face of the upper side housing 13. Accordingly, in the state assembled with the oil pump 11, the upper side housing 13 is formed in such a shape that covers the balancer drive gear 15, the first balancer shaft 14, the first gear 16, the second gear 25, the second balancer shaft 23, the reduction gear 24, and the pump drive gear 20, and is combined with the lower side housing 12.

As described above, an oil pump 11-side end face 22E (shown in FIG. 7) of the upper side housing 13 is extended beyond the pump drive gear 20 and the reduction gear 24 toward the oil pump 11-side, and the portion of the upper side housing 13 that cover the pump drive gear 20 and the reduction gear 24 serves as the oil shield wall 22. Accordingly, the oil shield wall 22 may be regarded as part of the upper side housing 13.

Furthermore, in order to drive the balancer main body, only the balancer drive gear 20 is exposed from the exposure opening 21 formed in the upper side housing 13 to be meshed with the engine-side gear 30. The length of the exposure opening 21 in the radial direction of the balancer drive gear 15 is determined according to the degree of exposure of the balancer drive gear 20. The length of the exposure opening 21 increases with an increase in degree of exposure.

This configuration causes the components of the balancer device 10 that exclude the exposure opening 21 of the upper side housing 13 but include the pump drive gear 20 of the oil pump 11 to be covered by the upper side housing 13 which integrally forms the oil shield wall 22. This configuration suppresses the lubricating oil dropping from the internal combustion engine 01 from falling on the pump drive gear 20 provided to drive the oil pump 11, and suppresses an increase in rotational resistance in the meshing portion between the reduction gear 24 and the pump drive gear 20. The lubricating oil received by the oil receiving portion 29 provided to reach a surface where the lower side housing 12 contacts the upper side housing 13 is discharged from a discharge hole 123 that is formed between an upper end portion 12C of the oil receiving portion 29 and the upper side housing 13, by the rotation of the pump drive gear 20. The lubricating oil received by the oil receiving portion 29 is scraped up toward the upper side housing 13 by the rotations of the pump drive gear 20 and the reduction gear 24. The oil shield wall 22 blocks the scraped-up lubricating oil and suppresses the lubricating oil from flying toward the crankshaft that is provided to drive and rotate the engine-side gear 30. This configuration suppresses an increase in rotational resistance of the crankshaft.

Figure 7:
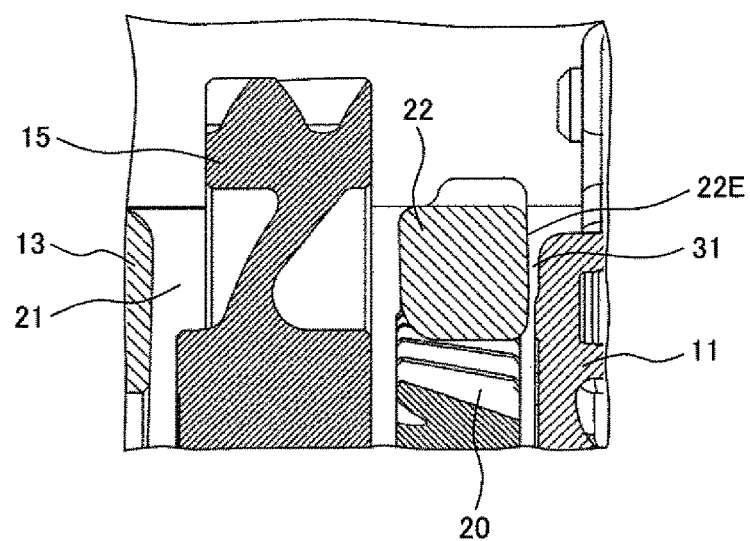
FIG. 7 is an enlarged cross sectional view of main part illustrating close-up of the vicinity of a pump drive gear shown in FIG. 1.

FIG. 7 is an enlarged cross sectional view illustrating the vicinity of the exposure opening 21. The balancer drive gear 15 protrudes upward from the exposure opening 21 to be exposed, and is meshed with the engine-side gear 30 (not shown). The oil shield wall 22 is formed adjacent to the exposure opening 21. The end face portion 22E of the oil shield wall 22 (in other words, the end face of the upper side housing 13) is arranged adjacent to an end face of the oil pump 11. A clearance 31 is formed between the end face portion 22E and the end face of the oil pump 11 in the direction of the rotational axis of the first balancer shaft 14. This clearance 31 is used as a gap to discharge, by the centrifugal force, the lubricating oil entering a part of the pump drive gear 20.

Referring back to FIG. 6, the oil receiving portion 29 provided in the lower side housing 12 contacts the oil pump 11 to form a space between the lower side housing 12 and the oil pump 11 for accommodating the reduction gear 24 and the pump drive gear 20. This configuration suppresses the lubricating oil accumulated in the oil pan from entering between the oil receiving portion 29 and the oil pump 11 into the space where the reduction gear 24 and the pump drive gear 20 are accommodated. This configuration accordingly suppresses an increase in rotational resistance caused by the exposure of the reduction gear 24 and the pump drive gear 20 to the lubricating oil.

The balancer device 10 is configured such that only the oil receiving portion 29 provided in the lower side housing 12 serves as the contact portion which is a fastening point to the oil pump 11 and that the clearance is provided between the oil pump 11 and the end face 22E of the oil shield wall 22 of the upper side housing. In the process of manufacturing the balancer device 10, there is no need for the processing to cause the end face 22E of the oil shield wall 22 to be flush with the contact surface of the oil receiving portion 29 with the oil pump 11 after the upper side housing 13 and the lower side housing 12 are fastened to each other by means of the plurality of balancer fastening bolts 06. As a result, this improves the productivity of the balancer device 10.

As shown in FIG. 5 and FIG. 6, the oil shield wall 22 constituting the upper side housing 13 is formed to connect left and right rear-side cylinder block fastening portions 13L and 13R with each other. This configuration reduces a moment applied to the oil pump 21 due to the vibrations during operation of the oil pump 11. The oil shield wall 22 also enhances the rigidity of the upper side housing 13.

Such functions decrease the deflection of the housing of the balancer device 10 and suppress misalignment of gear mesh between the reduction gear 24 fixed to the second balancer shaft 23 and the pump drive gear 20 fixed to the rotating shaft of the oil pump 11.

This accordingly prevents a partial contact of the gear tooth surface caused by the deterioration of the mesh state due to the misalignment of the gear mesh between the reduction gear 24 and the pump drive gear 20. This accordingly suppresses reduction of the sound vibration performance caused by poor tooth contact and improves the life of the gear by the appropriate tooth contact.

As described above, according to the embodiment, in the state that the balancer drive gear, the first balancer shaft including the balance weight, the first gear, the second gear, the second balancer shaft including the balance weight, and the reduction gear are mounted on the lower side housing and that the oil pump is further assembled therewith and the pump drive gear is meshed with the reduction gear, the upper side housing formed in such a shape that covers the balancer drive gear, the first balancer shaft including the balance weight, the first gear, the second gear, the second balancer shaft including the balance weight, the reduction gear, and the pump drive gear of the oil pump from above is assembled with the lower side housing. Only the balancer drive gear is exposed from the exposure opening formed in the upper side housing to be meshed with the engine-side gear.

The components of the balancer device that exclude the exposure opening of the upper side housing but include the pump drive gear are covered by the upper side housing. This configuration suppresses the lubricating oil dropping from the internal combustion engine from falling on the pump drive gear provided to drive the oil pump during operation of the internal combustion engine, and suppresses an increase in rotational resistance in the meshing portion between the reduction gear and the pump drive gear.

Embodiment 2

The following describes a second embodiment of the present invention. The first embodiment describes the configuration that the oil shield wall 22 is formed integrally with the upper side housing 13. This embodiment, on the other hand, describes a configuration that an oil shield wall 33 is formed separately from the upper side housing 13 and is fixed to the upper side housing 13 after the oil pump 11 is assembled therewith.

Figure 8:
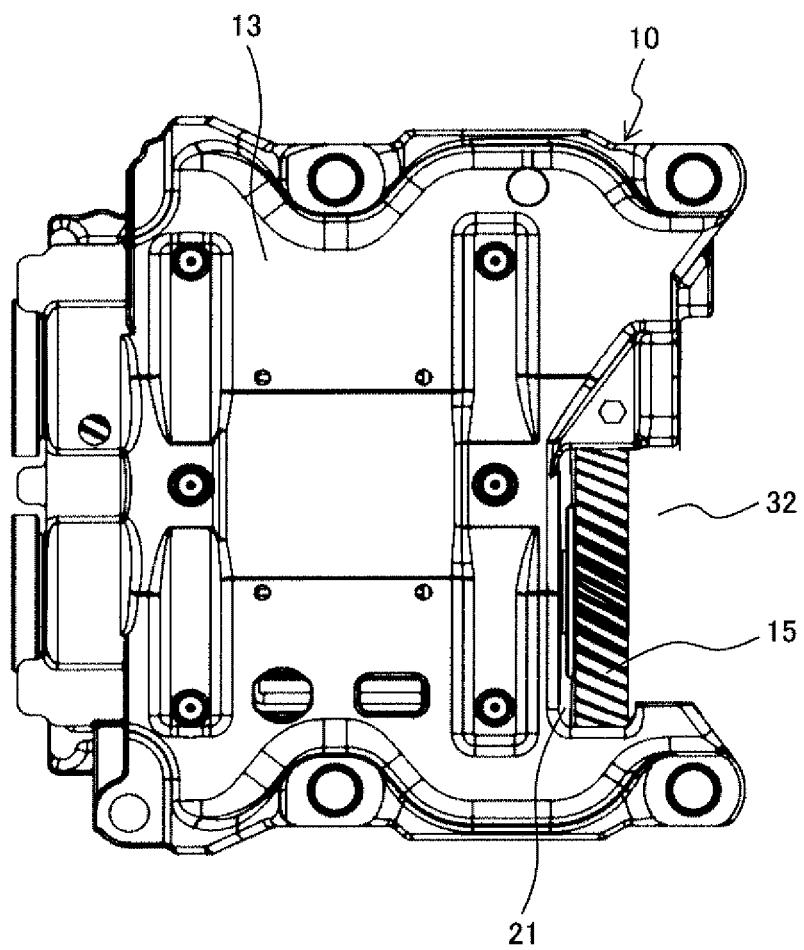
FIG. 8 is a top view illustrating a balancer device prior to assembling with an oil pump according to a second embodiment of the present invention.

FIG. 8 is a top view illustrating a balancer device 10 before an oil pump 11 is assembled therewith. An upper side housing 13 has an open region 32 that is formed by cutting off a location where the pump drive gear 20 is located, in addition to an exposure opening 21. Assembling the oil pump 11 with the balancer device 10 in this state provides the configuration of the assembly shown in FIG. 4 which omits the upper side housing 13 from the illustration. In this case, the presence of the open region 32 enables the oil pump 11 to be assembled from the upper side via the open region 32 in the state that the upper side housing 13 is assembled with the lower side housing 12.

Figure 9:
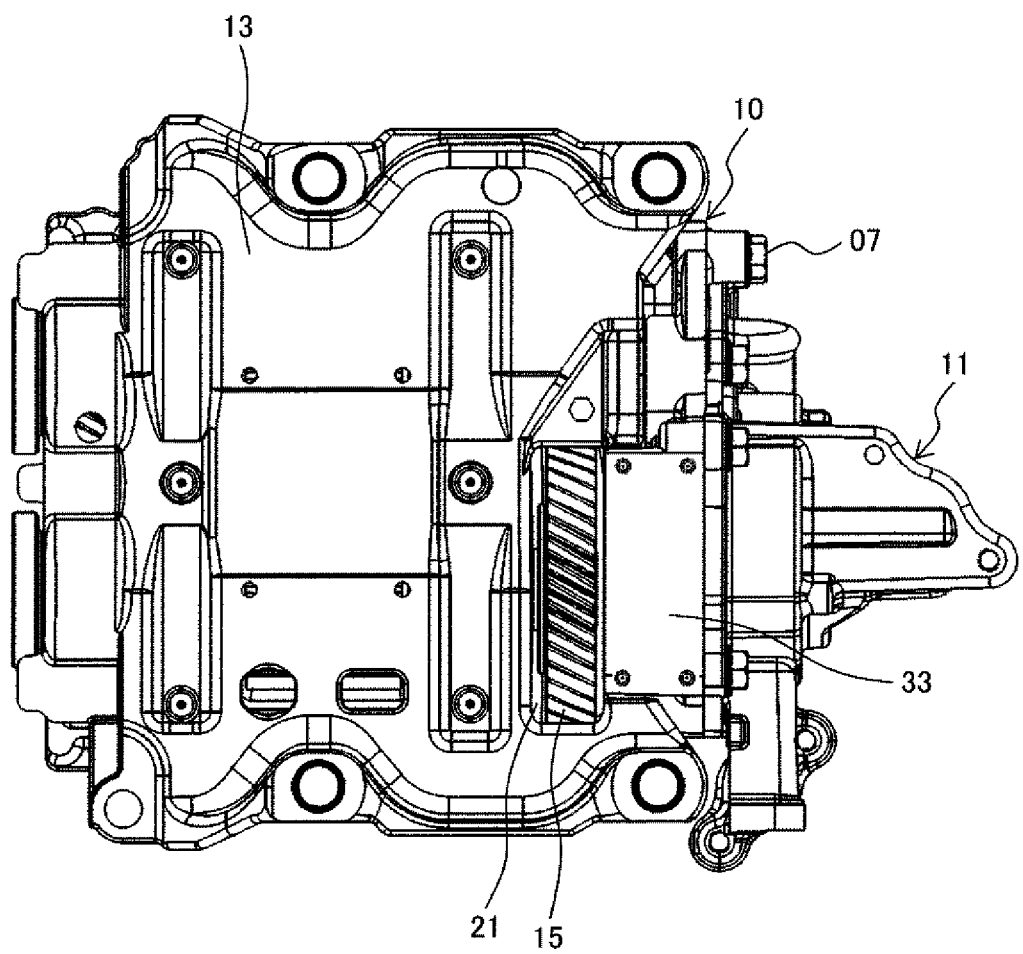
FIG. 9 is a top view illustrating the balancer device shown in FIG. 8 which is assembled with the oil pump and to which an oil shield wall are attached.

FIG. 9 illustrates the state that the open region 32 of the upper side housing 13 is closed by the separately formed oil shield wall 33 after the oil pump 11 is assembled therewith. The oil shield wall 33 may be formed in any shape and may be fixed by a fixation method, for example, fixation with bolts or fixation by welding. This embodiment employs bolt fixation by taking into account repairing or the like. The bolt fixation requires locking, in order to prevent bolts from being loosened by vibrations of the internal combustion engine.

Like the first embodiment, according to this embodiment, the components of the balancer device 10 that exclude the exposure opening 21 of the upper side housing 13 but include the pump drive gear 20 of the oil pump 11 are covered by the oil shield wall 33 and the upper side housing 13. This configuration suppresses the lubricating oil dropping from the internal combustion engine 01 from falling on the pump drive gear 20 provided to drive the oil pump 11, and suppresses an increase in rotational resistance in the meshing portion between the reduction gear 24 and the pump drive gear 20.

The configuration of this embodiment also enables the oil pump 11 to be assembled from the upper side via the opening region 32 that is provided in the upper side housing 13. This configuration accordingly has additional advantageous effects of simplifying the assembling process and reducing the assembling workload.

According to one embodiment of the present invention described above, in the state that the balancer drive gear, the first balancer shaft including the balance weight, the first gear, the second gear, the second balancer shaft including the balance weight, and the reduction gear are mounted on the lower side housing and that the oil pump is further assembled therewith and the pump drive gear is meshed with the reduction gear, the upper side housing formed in such a shape that covers the balancer drive gear, the first balancer shaft including the balance weight, the first gear, the second gear, the second balancer shaft including the balance weight, the reduction gear, and the pump drive gear of the oil pump from above is assembled with the lower side housing. Only the balancer drive gear is exposed from the exposure opening formed in the upper side housing to be meshed with the engine-side gear.

The components of the balancer device that exclude the exposure opening of the upper side housing but include the pump drive gear are covered by the upper side housing. This configuration suppresses the lubricating oil dropping from the internal combustion engine from falling on the pump drive gear provided to drive the oil pump, and suppresses an increase in rotational resistance in the meshing portion between the reduction gear and the pump drive gear.

The present invention is not limited to the embodiments described above but includes various modifications. For example, the embodiments described above are for the purpose of facilitating the understanding of the present invention and are not necessarily limited to the configurations including all the components described above. Part of the configuration of a certain embodiment may be replaced by the configuration of another embodiment. The configuration of another embodiment may be added to the configuration of a certain embodiment. Another configuration may be added to part of the configuration of each of the embodiments, or part of the configuration of each of the embodiments may be deleted or may be replaced with another configuration.

The present application claims priority to Japanese patent application No. 2016-215950 filed on Nov. 4, 2016. The entirety of the invention including the specification, the claims, the drawings, and the abstract of Japanese patent application No. 2016-215950 filed on Nov. 4, 2016 is hereby incorporated by reference into this application.

REFERENCE SIGNS LIST

10 . . . balancer device, 11 . . . oil pump, 12 . . . lower side housing, 13 . . . upper side housing, 14 . . . first balancer shaft, 15 . . . balancer drive gear, 16 . . . first gear, 17 . . . first balancer weight, 18 . . . front-side first bearing, 19 . . . rear-side first bearing, 20 . . . pump drive gear, 21 . . . exposure opening, 22 . . . oil shield wall, 23 . . . second balancer shaft, 24 . . . reduction gear, 25 . . . second gear, 26 . . . front-side second bearing, 27 . . . rear-side second bearing, 28 . . . second balancer weight, 29 . . . oil receiving portion, 30 . . . engine-side gear

The invention claimed is:

1. A balancer device for an internal combustion engine, the balancer device comprising:
a first balancer shaft including one end to which a balancer drive gear meshed with an engine-side gear that is rotated by the internal combustion engine is fixed, and an opposite end to which a first gear is fixed, the first balancer shaft further including a first balance weight provided between the balancer drive gear and the first gear;

a second balancer shaft including one end to which a second gear meshed with the first gear is fixed, and an opposite end to which a reduction gear meshed with a pump drive gear of an oil pump is fixed, the second balancer shaft further including a second balance weight provided between the second gear and the reduction gear;

a lower side housing on which the first balancer shaft and the second balancer shaft are mounted;

an upper side housing formed so as to cover the first balancer shaft and the second balancer shaft from above in a state in which the oil pump is assembled with the upper side housing such that the pump drive gear is meshed with the reduction gear, the upper side housing being assembled with the lower side housing; and an exposure opening formed in the upper side housing such that only the balancer drive gear is exposed from the upper side housing to be meshed with the engine-side gear.

2. The balancer device for the internal combustion engine according to claim 1, wherein an end face of the upper side housing serves as an oil shield wall which covers the reduction gear and the pump drive gear from above, so as to suppress lubricating oil dropping from the internal combustion engine from falling on the reduction gear and the pump drive gear.

3. The balancer device for the internal combustion engine according to claim 2, wherein an oil receiving portion is formed in an end face of the lower side housing to receive the lubricating oil flowing to the reduction gear and the pump drive gear, and the reduction gear and the pump drive gear are located between the oil shield wall and the oil receiving portion.

4. A balancer device for an internal combustion engine, the balancer device comprising:

a first balancer shaft including one end to which a balancer drive gear meshed with an engine-side gear that is rotated by the internal combustion engine is fixed, and an opposite end to which a first gear is fixed, the first balancer shaft further including a first balance weight provided between the balancer drive gear and the first gear;

a second balancer shaft including one end to which a second gear meshed with the first gear is fixed, and an opposite end to which a reduction gear meshed with a pump drive gear of an oil pump is fixed, the second balancer shaft further including a second balance weight provided between the second gear and the reduction gear;

a lower side housing on which the first balancer shaft and the second balancer shaft are mounted;

an upper side housing formed so as to cover the first balancer shaft and the second balancer shaft from above in a state in which the oil pump is assembled with the upper side housing such that the pump drive gear is meshed with the reduction gear, and formed so as to have a region above the pump drive gear, the upper side housing being assembled with the lower side housing;

an oil shield wall formed separately from the upper side housing and fixed to the upper side housing so as to close the region; and an exposure opening formed in the upper side housing such that the balancer drive gear is exposed from the upper side housing to be meshed with the engine-side gear.

5. A balancer device for an internal combustion engine, the balancer device comprising:

a first balancer shaft including one end to which a balancer drive gear meshed with an engine-side gear that is rotated by the internal combustion engine is fixed, and an opposite end to which a first gear is fixed, the first balancer shaft further including a first balance weight provided between the balancer drive gear and the first gear;

a second balancer shaft including one end to which a second gear meshed with the first gear is fixed, and an opposite end to which a reduction gear meshed with a pump drive gear of an oil pump is fixed, the second balancer shaft further including a second balance weight provided between the second gear and the reduction gear;

a lower side housing on which the first balancer shaft and the second balancer shaft are mounted;

an upper side housing formed so as to cover the first balancer shaft and the second balancer shaft from above in a state that the oil pump is assembled with the upper side housing such that the pump drive gear is meshed with the reduction gear, the upper side housing being assembled with the lower side housing;

an exposure opening formed in the upper side housing to expose the balancer drive gear;

an oil shield wall adjacent to the exposure opening to cover the reduction gear and the pump drive gear, a clearance being formed between the oil shield wall and the oil pump in a direction of a rotational axis of the first balancer shaft; and an oil receiving portion configured to cover the reduction gear and the pump drive gear in a circumferential direction relative to the rotational axis of the balancer shafts and to contact the oil pump in the direction of the rotational axis of the balancer shafts.

* * * * *